(12) United States Patent
Feicht (10) Patent No.: US 10,809,147 B2
(45) Date of Patent: Oct. 20, 2020

(54) SYSTEM AND METHOD FOR MONITORING HYDROGEN FLUX

(71) Applicant: University of New Brunswick, Fredericton (CA)

(72) Inventor: Andrew Feicht, Fredericton (CA)

(73) Assignee: University of New Brunswick, Fredericton, NB (CA)

( * ) Notice: Subject to any disclaimer, the term of this patent is extended or adjusted under 35 U.S.C. 154(b) by 52 days.

(21) Appl. No.: 15/564,978

(22) PCT Filed: Apr. 7, 2016

(86) PCT No.: PCT/CA2016/050400
§ 371 (c)(1),
(2) Date: Oct. 6, 2017

(87) PCT Pub. No.: WO2016/161513
PCT Pub. Date: Oct. 13, 2016

(65) Prior Publication Data
US 2018/0073956 A1    Mar. 15, 2018

Related U.S. Application Data

(60) Provisional application No. 62/144,318, filed on Apr. 7, 2015.

(51) Int. Cl.
*G01M 3/28* (2006.01)
*G01M 3/32* (2006.01)
(Continued)

(52) U.S. Cl.
CPC ............ *G01M 3/2815* (2013.01); *G01K 7/02* (2013.01); *G01K 7/16* (2013.01); *G01M 3/007* (2013.01); *G01M 3/3272* (2013.01); *G01N 7/10* (2013.01)

(58) Field of Classification Search
CPC .. G01M 3/2815; G01M 3/007; G01M 3/3272; G01K 7/02; G01K 7/16; G01N 7/10
(Continued)

(56) References Cited

U.S. PATENT DOCUMENTS 3,113,790 A * 12/1963 Matthiessen .......... F16L 55/179
285/45
3,942,546 A * 3/1976 Radd ........................ G01N 7/10
137/93
(Continued)

FOREIGN PATENT DOCUMENTS

| CA | 1189570 | 6/1985 |
| EP | 1114992 A2 | 7/2001 |
| WO | 1983003007 A1 | 9/1983 |

OTHER PUBLICATIONS

"Hydrogen Separation Membranes", Argonne National Laboratory, 2010. (Year: 2010).*
(Continued)

*Primary Examiner* — David A Rogers
(74) *Attorney, Agent, or Firm* — Eugene F. Derenyi; Fogler, Rubinoff LLP (57) ABSTRACT

System and method for monitoring hydrogen flux across the wall of a vessel or pipe, the system including a monitored volume for sealing an attachment to an outside surface of the wall of the vessel or pipe for collecting hydrogen escaping across the wall surface; a membrane selectively permeable to hydrogen in fluid communication with the monitored volume for permitting hydrogen to escape from the monitored volume in between the two at a defined rate such that hydrogen pressure equilibrium may be reached in the monitored volume for a given hydrogen flux across the wall surface of the vessel or pipe; a pressure measuring device in fluid communication with the monitored volume for measuring hydrogen pressure in the monitored volume; and a temperature measuring device in fluid communication with the monitored volume for measuring temperature in the monitored volume.

13 Claims, 4 Drawing Sheets

(51) Int. Cl.
*G01K 7/02* (2006.01)
*G01K 7/16* (2006.01)
*G01M 3/00* (2006.01)
*G01N 7/10* (2006.01)

(58) Field of Classification Search
USPC .................................................. 73/40.5 R
See application file for complete search history.

(56) References Cited

U.S. PATENT DOCUMENTS

| | | | |
|---|---|---|---|
| 4,065,373 A | 12/1977 | Martin et al. | |
| 4,221,651 A | 9/1980 | Mansfeld et al. | |
| 4,255,963 A * | 3/1981 | Down | G01N 7/10 73/19.1 |
| 4,373,375 A | 2/1983 | Terhune et al. | |
| 5,144,831 A * | 9/1992 | Hale | G01N 7/10 73/19.05 |
| 5,259,870 A | 11/1993 | Edlund | |
| 5,330,720 A * | 7/1994 | Sorbo | G01M 3/183 277/320 |
| 6,133,567 A * | 10/2000 | Baumgardner | A61B 5/1459 250/288 |
| 6,196,060 B1 | 3/2001 | Yepez et al. | |
| 6,419,728 B1 | 7/2002 | Edlund et al. | |
| 6,547,858 B1 | 4/2003 | Edlund et al. | |
| 6,554,015 B1 | 4/2003 | Witt | |
| 6,554,981 B2 | 4/2003 | Lewis, II et al. | |
| 6,637,253 B2 | 10/2003 | Dean | |
| 6,814,854 B2 | 11/2004 | Lewis, II et al. | |
| 7,552,643 B2 * | 6/2009 | Aikens | G01M 3/22 73/198 |
| 7,779,528 B2 * | 8/2010 | Liepert | G01M 3/20 29/592 |
| 8,616,046 B2 | 12/2013 | Wetzig | |
| 8,744,792 B2 * | 6/2014 | Tindall | G01N 13/00 702/100 |
| 2007/0125153 A1 | 6/2007 | Visel et al. | |
| 2008/0233010 A1 * | 9/2008 | Blencoe | G01N 15/082 422/82.12 |

OTHER PUBLICATIONS

Derek Lister et al., "Determining Water Chemistry Conditions in Nuclear Reactor Coolants", Journal of Nuclear Science and Technology, vol. 52, No. 4, 24 Sep. 2014. (Year: 2014).*

Jei Choi, "Diffusion of Hydrogen in Iron", Metallurgical Transactions, vol. 1, Apr. 1970. (Year: 1970).*

McKeen, K., Lalonde, M., Scott, A., Ross, J., "Hydrogen Effusion Probe Development and Installation at the Joint Lepreau Generating Station", 28th Annual Conference of the Canadian Nuclear Society—Embracing the Future: Canada's Nuclear Renewal and Growth, v2, 2007, pp. 1045-1056.

Stuart, C.R., Cook, W. and Gardner, E, "Primary Heat Transport System Return to Service Following the Refurbishment Outage At the Point Lepreau Generating Station", Proceedings, Nuclear Plant Chemistry Conference—NPC2014, Sapporo, Japan, Oct. 2014.

Morreale, B.D. et al, "The permeability of hydrogen in bulk palladium at elevated temperatures and pressures", Journal of Membrane Science, vol. 212, pp. 87-97, 2003.

* cited by examiner

SYSTEM AND METHOD FOR MONITORING HYDROGEN FLUX

FIELD

The present disclosure relates to hydrogen flux monitoring. Certain embodiments provide a system and method for measuring pressure and temperature of hydrogen in a sample space and calculating the rate of hydrogen flux.

BACKGROUND

Various on-line hydrogen effusion probes have been developed for monitoring hydrogen flux from pipes undergoing corrosion. Such systems typically require sophisticated and sometimes cumbersome electronics and hardware (pump, cabinet, etc).

BRIEF DESCRIPTION OF THE DRAWINGS

Examples are illustrated with reference to the attached figures. It is intended that the examples and figures disclosed herein are to be considered illustrative rather than restrictive.

FIG. 4a is a side view of a finned type HPD in accordance with an example;

FIG. 4b is an end view of the finned type HPD of FIG. 4a as seen from the right of FIG. 4a;

DETAILED DESCRIPTION

It will be understood by those of ordinary skill in the art that the terms "effusion" and "diffusion" are used synonymously herein in the context of corrosion monitoring of pipes and vessels to mean the escape of hydrogen across a wall of a pipe or vessel.

The following describes a system for monitoring hydrogen effusion across the wall of a vessel or pipe, the system including a monitored volume for sealing an attachment to an outside surface of the wall of the vessel or pipe for collecting hydrogen effusing across the wall surface; a membrane selectively permeable to hydrogen in fluid communication with the monitored volume for permitting hydrogen to escape from the monitored volume in between the two at a defined rate such that hydrogen pressure equilibrium may be reached in the monitored volume for a given hydrogen effusion rate across the wall surface of the vessel or pipe; a pressure measuring device in fluid communication with the monitored volume for measuring hydrogen pressure in the monitored volume; and a temperature measuring device in fluid communication with the monitored volume for measuring temperature in the monitored volume. The monitored volume may be a cup with a sealing gasket for sealing the cup to the wall of the vessel or pipe. The system volume may further include VCR® metal tube fittings arranged in a cross having four branches, a tube connecting the cup to a branch of the cross, and wherein the pressure measuring device is connected to a branch of the cross, and the temperature measuring device is connected to a branch of the cross. The system may further include a valve connected to the cup to which a vacuum pump is attachable for evacuating the monitored volume. In the system, the pressure monitoring device may be a pressure transducer and the temperature measuring device may be a thermocouple or resistance temperature detector ("RTD").

According to another example, the system described herein is for monitoring hydrogen flux across the wall of a vessel or pipe, the system including a first closed container defining a monitored volume and including a first inlet into the first closed container for sealing attachment to an outside surface of the wall of the vessel or pipe for collecting, via the inlet, hydrogen escaping across the wall surface, the first closed container further including a first outlet from the first closed container, a membrane selectively permeable to hydrogen at the outlet for permitting hydrogen to escape from the monitored volume at a defined rate such that hydrogen pressure equilibrium may be reached in the monitored volume for a given hydrogen flux across the wall of the vessel or pipe, a pressure measuring device in fluid communication with the monitored volume for measuring hydrogen pressure in the monitored volume, and a temperature measuring device in fluid communication with the monitored volume for measuring temperature in the monitored volume. The first closed container can include a second outlet and the pressure monitoring device can be connected to the second outlet. The first closed container can include a third outlet and the pressure monitoring device can be connected to the third outlet. The system can further include a second closed container and a tube connecting the first outlet to the second closed container and wherein the membrane, the pressure measuring device and the temperature measuring device can be connected to the second closed container. The first closed container can be a cup with a sealing gasket for sealing the cup to the wall of the vessel or pipe. The second closed container can be a vacuum fitting. The vacuum fitting can be a cross having four branches, and the system can further include a tube connecting the first outlet of the cup to a first branch of the cross, and wherein the pressure measuring device can be connected to a second branch of the cross, the temperature measuring device can be connected to a third branch of the cross, and the membrane can be connected to a fourth branch of the cross.

The following also describes a method for monitoring hydrogen effusion across the wall of a vessel or pipe, the method including providing a closed volume sealingly attached to the outside surface of the wall of the vessel or pipe; providing a membrane selectively permeable to hydrogen in fluid communication with the monitored volume for permitting hydrogen to escape from the monitored volume at a defined rate such that hydrogen pressure equilibrium may be reached in the monitored volume for a given hydrogen effusion rate across the wall surface of the vessel or pipe; allowing hydrogen pressure in the monitored volume to reach an equilibrium state where the rate of hydrogen effusion across the wall into the monitored volume is in equilibrium with the rate of hydrogen escape across the membrane; measuring the pressure and temperature in the monitored volume; and calculating the rate of hydrogen effusion across the wall using the measured pressure and temperature values. The pressure and temperature measurement may be carried out with the pressure in the monitored volume in an equilibrium state. The pressure and temperature measurement may also be carried out with the pressure in the monitored volume in a transient state. The rate of hydrogen effusion may be related to a hydrogen concentration in the vessel or the pipe. The rate of hydrogen effusion may also be related to a corrosion rate of the wall of the vessel or pipe.

In another example, the method described herein is for monitoring hydrogen flux across the wall of a vessel or pipe, the method including providing a closed volume sealingly attached to the outside surface of the wall of the vessel or pipe for receiving hydrogen escaping from the vessel or pipe, providing a membrane selectively permeable to hydrogen in fluid communication with the closed volume for permitting hydrogen to escape from the closed volume at a defined rate such that hydrogen pressure equilibrium may be reached in the closed volume for a given hydrogen flux across the wall of the vessel or pipe, allowing hydrogen pressure in the closed volume to reach an equilibrium state where the hydrogen flux across the wall into the closed volume is in equilibrium with the hydrogen flux across the membrane out of the closed volume, measuring the pressure and temperature in the closed volume; and calculating the rate of hydrogen flux across the wall using the measured pressure and temperature values. The pressure and temperature measurements can be carried out with the pressure in the closed volume in an equilibrium state. The pressure and temperature measurements can be carried out with the pressure in the closed volume in a transient state. The hydrogen flux into the closed volume can be related to a hydrogen concentration in the vessel or the pipe. The hydrogen flux can be related to a corrosion rate of the wall of the vessel or pipe.

Throughout the following description, specific details are set forth in order to provide a more thorough understanding to persons skilled in the art.

However, well-known elements may not be shown or described in detail to avoid unnecessarily obscuring the disclosure. Accordingly, the description and drawings are to be regarded in an illustrative, rather than a restrictive, sense.

This disclosure relates generally to hydrogen detection systems and methods, and particularly to systems and methods for measuring hydrogen flux though a pipe wall.

A prior art hydrogen effusion probe developed by the Centre for Nuclear Energy Research (CNER) Institute at the University of New Brunswick equates the rate of hydrogen captured in a monitored volume at the outer surface of a pipe/vessel to the through-wall flux; returning that monitored volume to vacuum frequently. The CNER probe, also called HEPro, is the subject of U.S. Pat. No. 7,552,643, which is incorporated herein by reference in its entirety. The HEPro allows for reliable and accurate measurements of pressure increase within a monitored volume directly equating the pressure rise to hydrogen flux through the pipe or vessel being monitored. However, this configuration requires a control cabinet to be installed near the pipe or vessel of interest to house the control and vacuum equipment. The vacuum equipment must be installed to the HEPro during operation for periodic pump-down of the closed volume being monitored.

According to one example, the new system described herein uses a monitored temperature and pressure within a closed volume of a system to allow for calculation of a through-wall hydrogen flux, providing a measure of process system conditions and health. This system differs from conventional hydrogen effusion technologies in that the pressure of hydrogen within the monitored volume is moderated by a hydrogen permeation device (also referred to herein as the "HPD") tailored for site-specific flux range and operational conditions.

According to one example, the HPD includes a membrane made of a material which is selectively permeable to hydrogen. The hydrogen permeable membrane does not require mechanical actuation or external control equipment and does not require that the monitored volume of the system be periodically evacuated as in the HEPro. It relies upon the inherent physical properties of the membrane material to allow for controlled hydrogen diffusion and escape from the monitored volume.

According to one example, the probe assembly, utilizing the HPD, also introduces a shift in the monitoring methodology. Rather than measuring the rate of hydrogen collection in a monitored volume and equating that to through-wall flux as in the HEPro, this example uses the monitored volume's pressure, where in combination with a mathematical model of the hydrogen transport mechanisms involved, the through-wall flux of hydrogen (through the wall of a vessel or pipe for example) can be readily calculated. The calculation uses readings of the pressure and temperature within the monitored volume to determine the rate of hydrogen flux through the HPD, and hence the inward hydrogen flux from the process (such as a pipe or vessel) being monitored.

According to one example, the entire system is mounted and self-supporting on the pipe or vessel being monitored and is powered via a standard 4-20 mA control loop. The need for periodic pump-down from a vacuum system, as in the HEPro, is no longer required; although, a pump-down is recommended to establish or re-establish vacuum conditions following installation and during routine maintenance activities.

According to one example, the system relies upon the HPD for ensuring a measurable gas pressure, within a specified range (typically 1 kPa to 120 kPa absolute pressure), is maintained in the closed volume of the system.

Without being bound by theory, the fundamental process occurring is the migration of hydrogen atoms, which diffuse into the system through the wall of the pipe or vessel being monitored and out of the system through the HPD. According to one example, the steps in the monitoring process include:

1. Creation of atomic hydrogen on the process-side (e.g. inside wall surface) of a vessel or a pipe. This may occur in two ways:
   a. adsorption of molecular hydrogen on the surface and subsequent equilibrium establishment between the $H_2$ and the atomic hydrogen ("H-atom"), or;
   b. reduction of $H^+$ ions in an aqueous solution in the vessel or pipe driven by the anodic corrosion of the metal or alloy.
2. Diffusion of the H-atoms through the vessel or pipe wall into a closed volume of a hydrogen monitoring system in accordance with the present disclosure, and recombination to molecular hydrogen within the closed volume of the system;
3. Creation of H-atoms on the HPD material within the closed volume of the system;
4. Diffusion of the H-atoms through the HPD material;
5. Recombination to molecular hydrogen on the external surface of the HPD; and;
6. Desorption (release into the atmosphere) of the effused molecular hydrogen.

Materials such as platinum and palladium act to catalyze the equilibrium exchange reaction of molecular hydrogen to atomic hydrogen ($H_{2ads} \leftrightarrow 2H$) [References 1, 2 and 3 therein]. Palladium is known to be a very permeable material to hydrogen with typical permeability values in the range of $10^{-9}$-$10^{-7}$ mol/m·s·Pa$^{1/2}$ at temperatures between 25° C. and 500° C. [Reference 3 herein]. At some of the operating temperatures envisaged for deployment of the system (up to 500° C. in some power plant or refinery applications) the hydrogen diffusion through pure palladium metal is very fast, limiting the controlled back-pressure achievable in the cavity and making practical measurements impossible. Alloys of palladium showed marked improvement in maintaining measurable pressures within the closed volume and may include up to 50% of copper, nickel or silver alloyed with the palladium.

Figure 1:
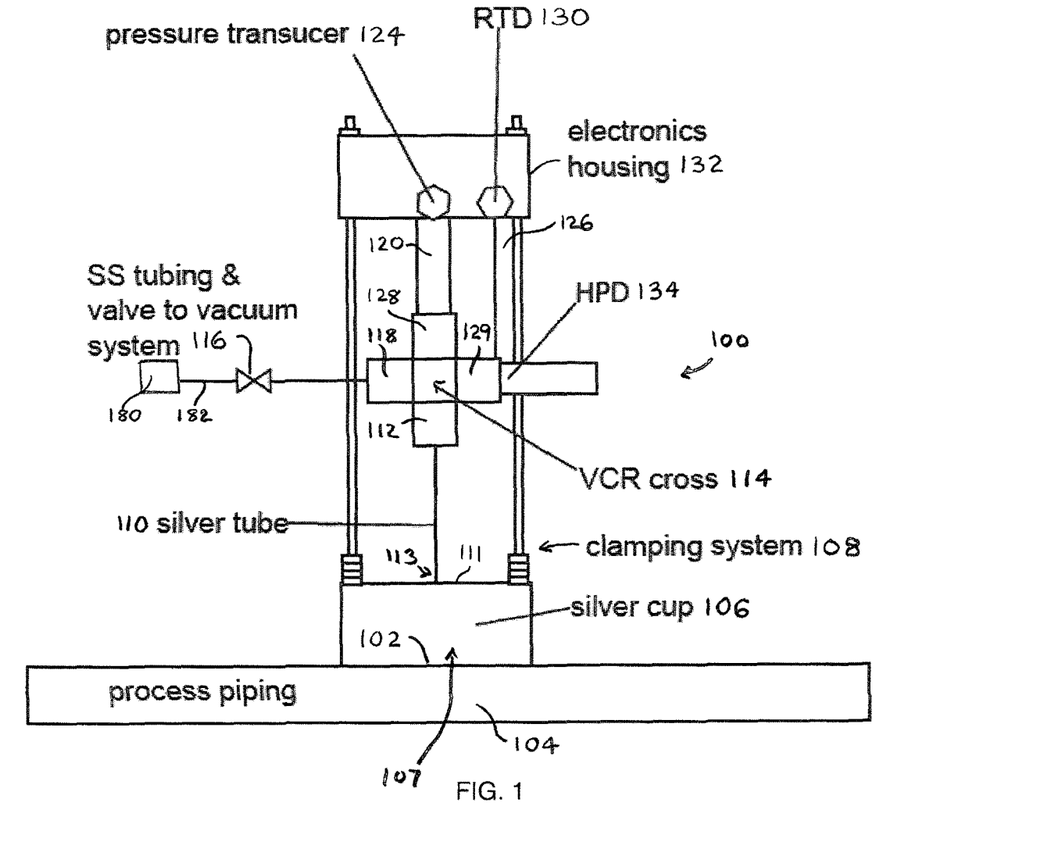
FIG. 1 is schematic diagram of a system in accordance with an example.

According to one example, a schematic drawing of an HPPro sensor system indicated generally by 100 is shown in FIG. 1. The system 100 is attached to the wall 102 of a pipe 104. The system 100 utilizes a silver cup 106 having an inlet opening indicated generally at 107 which is non-intrusively sealed to the outside of the wall 102 of the pipe 104 to capture hydrogen from the pipe 104. An example of a cup which can be used for the cup 106 is described in U.S. Pat. No. 7,552,643 which is incorporated herein by reference in its entirety. A clamping system indicated generally by 108 and not described in detail herein is provided for clamping the system 100 to the pipe 104. U.S. Pat. No. 7,552,643 describes an example clamping system which can be used. It will be understood by a person skilled in the art that other suitable clamping and sealing systems may be employed.

A small bore silver tube 110 is welded to the top 111 of cup 106 and connects an outlet indicated generally at 113 in the top 111 of the cup 106 to branch fitting 112 of a conventional cross vacuum fitting indicated generally at 114. In one example, an off-the-shelf Swagelok® VCR® vacuum fitting is used. A stainless steel ("SS") tubing and valve system 116 is connected to branch fitting 118 of the vacuum coupling 114. Vacuum equipment (not shown) can be connected to the system 116 when needed to evacuate the system as further detailed below.

A pipe 120 connects branch fitting 128 of the vacuum coupling 114 to pressure transducer 124. A pipe 126 connects branch fitting 129 of the vacuum coupling 114 to an RTD 130. The transducer 124 and the thermocouple ("RTD") 130 are housed in electronics housing 132 which includes electronics (not shown) to control the operation of the system 100. An HPD 134 is connected to the branch fitting 129 of the vacuum coupling 114. The cup 106, the tube 110, the vacuum coupling 114, the system 116, the tube 120, the pressure transducer 124, the tube 126, the RTD 130 and the HPD 134 are in fluid communication and collectively form a closed (monitored) volume.

Figure 2:
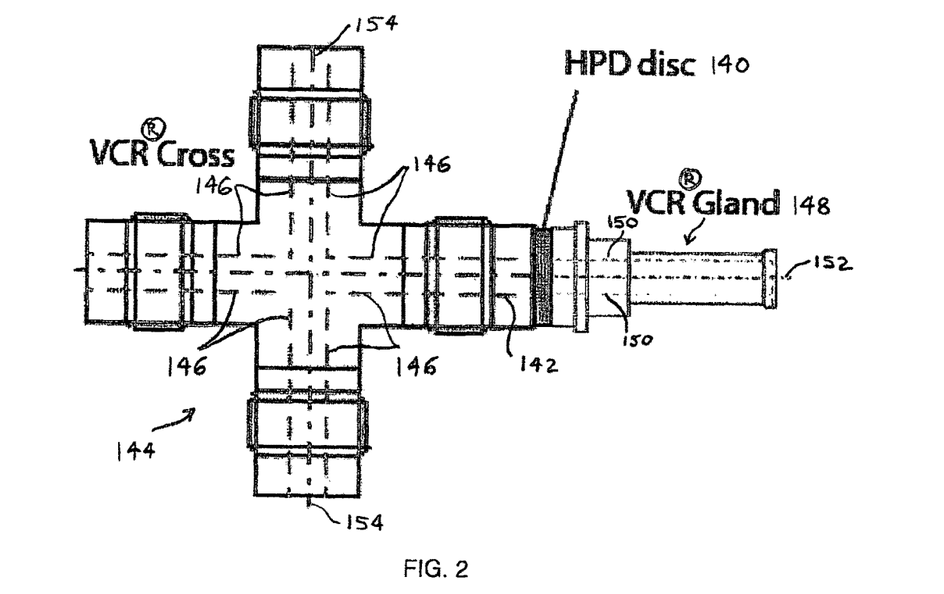
FIG. 2 is a schematic diagram of a disc type hydrogen permeation device (HPD) in accordance with an example.
Figure 3:
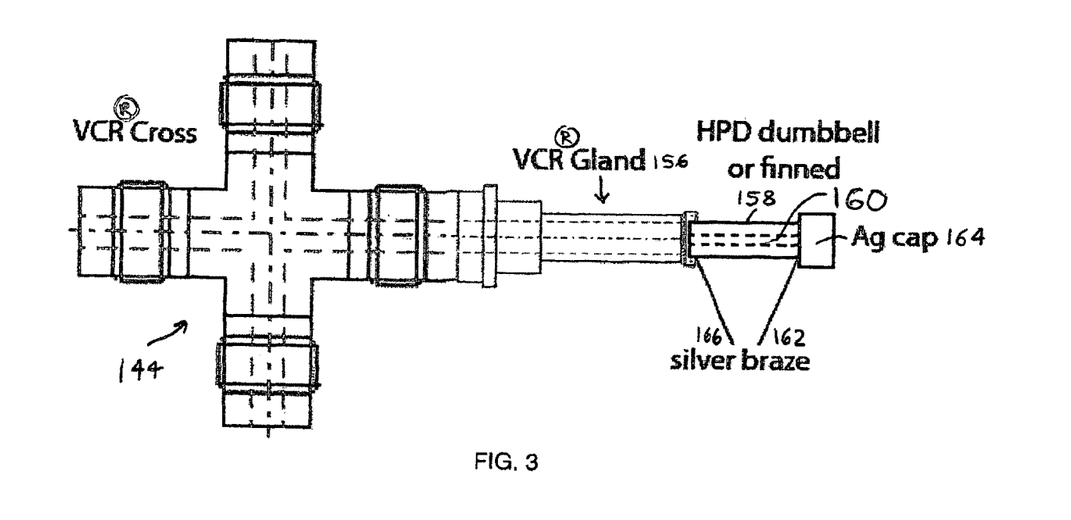
FIG. 3 is a side view of a dumbbell type HPD in accordance with an example.
Figures 4A, 4B:
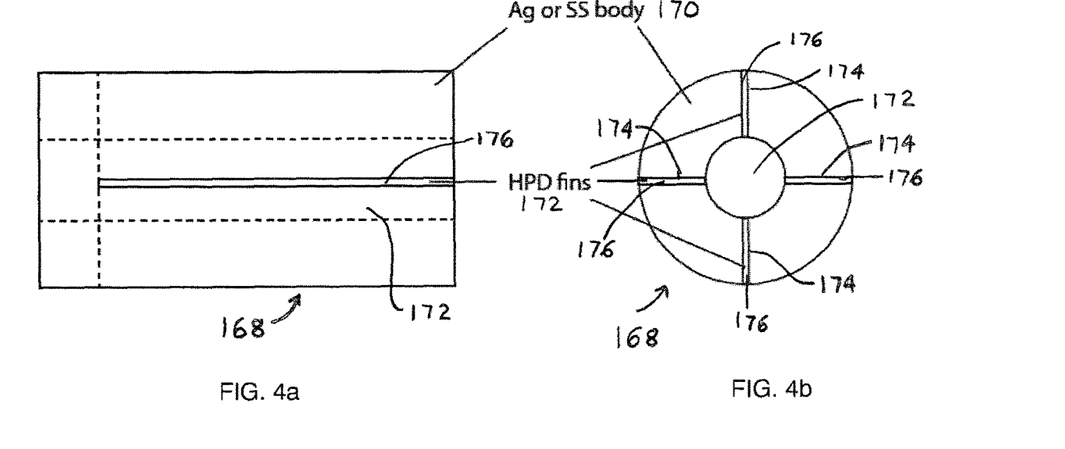

Three alternate example arrangements for the HPD 134 include a disc HPD shown in FIG. 2, a dumbbell HPD shown in FIG. 3 and a finned HPD shown in FIG. 4. The disc HPD includes an HPD disc 140 comprised of a suitable Pd-based alloy that acts as the sealing gasket between the sealing faces of a branch fitting 142 of a cross fitting indicated generally at 144 (which corresponds to cross vacuum fitting 114 in FIG. 1) and a VCR® socket weld gland indicated generally at 148. The thickness and diameter of the HDP disc 140 is tailored to the specific application and hydrogen effusion rate expected. The cross fitting 144 has internal interconnecting bores which are defined by stippled lines 146. The gland 148 has internal interconnecting longitudinal bores which are defined by stippled lines 150. Central axis 152 and 154 are shown for reference.

The dumbbell HPD includes a conventional VCR® socket weld gland indicated generally at 156, a small-bore, palladium-alloy tube 158 with a length and longitudinal bore 160 of a bore size tailored to the specific application and hydrogen effusion rate expected. Example dimensions are tubes between 4-6 mm in diameter, 1-5 cm in length and with a 0.5-1.0 mm hole drilled through the centre. The distal end of the tube 158 is brazed with silver brazing 162 and enclosed with a cap 164 comprising a piece of solid silver ("Ag") while the proximal end of the tube 158 is connected to the gland 156 by silver brazing 166.

The finned HPD is similar to the dumbbell HPD except that the tube indicated generally at 168 in FIGS. 4*a* and 4*b* is substituted for the tube 158 in FIG. 3. The tube 168 comprises a silver or stainless steel body 170 and central longitudinal bore 172. The body 170 includes slots 174 (also referred to as HPD fins) in a crucifix arrangement machined through the tube body 170 wall. A thin Pd-alloy foil 176 is inserted into the slots and brazed into place. The external surface of the body 170 is machined and polished to final dimensions such that hydrogen permeation is permitted solely through the foils 176.

In another example, the HPD membrane, pressure transducer, and thermocouple are directly connected to the cup 106. In a further example, the HPD membrane is in the outlet of the cup.

In operation, the system 100 is installed by clamping the system 100 to the outside of the wall of a vessel or pipe such that the cup 106 sealingly engages the wall. A vacuum pump 180 in FIG. 1 is connected to the valve system 116 via stainless steel tubing 182. The vacuum pump 180 is actuated for an initial pump-down of the internal volume of the system 100, which volume is generally defined by the internal volumes of the cup 106, silver tube 110, cross 114, tube 120, transducer 124, tube 126, RTD 130 and HPD 134. Although the system 100 can function properly without initially evacuating the internal volume, such an evacuation is recommended at the time of initial installation and periodically during the service life of the system 100. The vacuum pump 180 can be releasably connected to the valve system 116 on those occasions. There is no need to maintain the vacuum pump in place during the entire service life of the system 100. In this way, the vacuum pump 180 can be used for a number of installations thus reducing equipment cost.

In an example, the HPD membrane is selectively permeable to hydrogen. In another example, the HPD membrane's permeability is several orders of magnitude (>10000 times) higher than the materials comprising the rest of the monitored volume. With this in mind, other configurations for the system are possible. For example, the HPD membrane can be located in a wall of the cup 106 (or other suitable monitored volume) and the transducer 124 and RTD 130 can be connected directly to the cup 106. If the rate of diffusion of hydrogen and more particularly H-atoms through HPD material be known, the measured pressure and temperature of the hydrogen in the monitored volume can be related to the rate of hydrogen effusion across the wall of the vessel or pipe being monitored.

Experimental Testing

Example HPD systems have been tested with hydrogen pressures internal to the pipe being monitored of up to 5 psi and at temperatures up to 400° C. In effect, since the HPPro sensor and the HPD is a non-intrusive, clamp-on monitoring technology, there is no specific limit to the operating pressure or temperature range for which the system could be used. The non-intrusive, external nature of the sensor allows it to be designed per location to provide adequate cooling of the HPD and auxiliary components. The HPD itself will typically operate at temperatures below 100° C., where the process being monitored could be from −20° C. to 600° C.

at pressures up to 500 atmospheres. A trained operator is able to calculate the hydrogen flux into the HPPro sensor through Fick's law of diffusion as shown in equations (1) and (2) for a disc-type (or finned-type) or dumbbell-type HPD respectively. With detailed knowledge of the overall monitored volume, the pressure within the volume and temperature at the HPD, the trained user can equate the hydrogen flux input by having a pre-calibrated and known hydrogen permeability constant ($\phi$HPD) through the HPD. The input hydrogen flux may then be related to hydrogen concentration within the process being monitored (step 1a above) and hence potential of hydrogen damage that may occur, or to the corrosion rate of the process piping or vessel being monitored (though step 1b above).

disc type and finned type HPD: (1)
$$\frac{dP}{dt} = \frac{RT}{V}\left[A_{cup}J_{H_2} - \frac{\phi_{HPD}A_{HPD}P^{1/2}}{X_{HPD}}\right]$$

dumbbell type HPD: (2)
$$\frac{dP}{dt} = \frac{RT}{V}\left[A_{cup}J_{H_2} - \frac{2\pi\phi_{HPD}L_{HPD}P^{1/2}}{\ln(r_{iHPD}/r_{oHPD})}\right]$$

where:
P=pressure inside monitored volume of HPPro sensor (Pa)
t=time (seconds)
R=Ideal gas constant (8.3145 J/mol K)
T=temperature of HPD inside monitored volume (K)
V=total monitored volume contained within HPPro sensor (m$^3$)
$A_{cup}$=surface area allowing hydrogen to diffuse into monitored volume (m$^2$)
$A_{HPD}$=surface area allowing hydrogen to escape monitored volume (m$^2$)
$X_{HPD}$=thickness of the HPD material (m)
$L_{HPD}$=length of dumbbell-style HPD (m)
$r_{iHPD}$=inner radius of dumbbell-style HPD (m)
$r_{oHPD}$=outer radium of dumbbell-style HPD (m)
$J_{H2}$=hydrogen flux into monitored volume of HPPro sensor (mol/m$^2$.s)
$\phi_{HPD}$=hydrogen permeability of the HPD material (mol/ m$^{-1}$ s$^{-1}$ Pa$^{-1/2}$)

Figure 5:
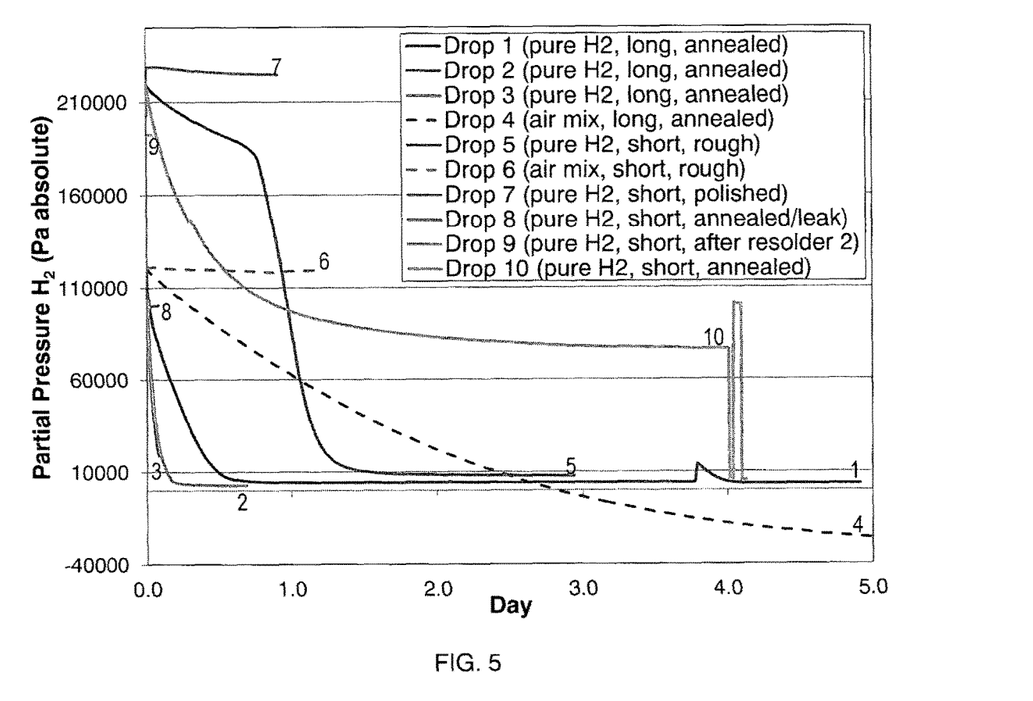
FIG. 5 are graphs of example HPD calibration tests.
Figure 6:
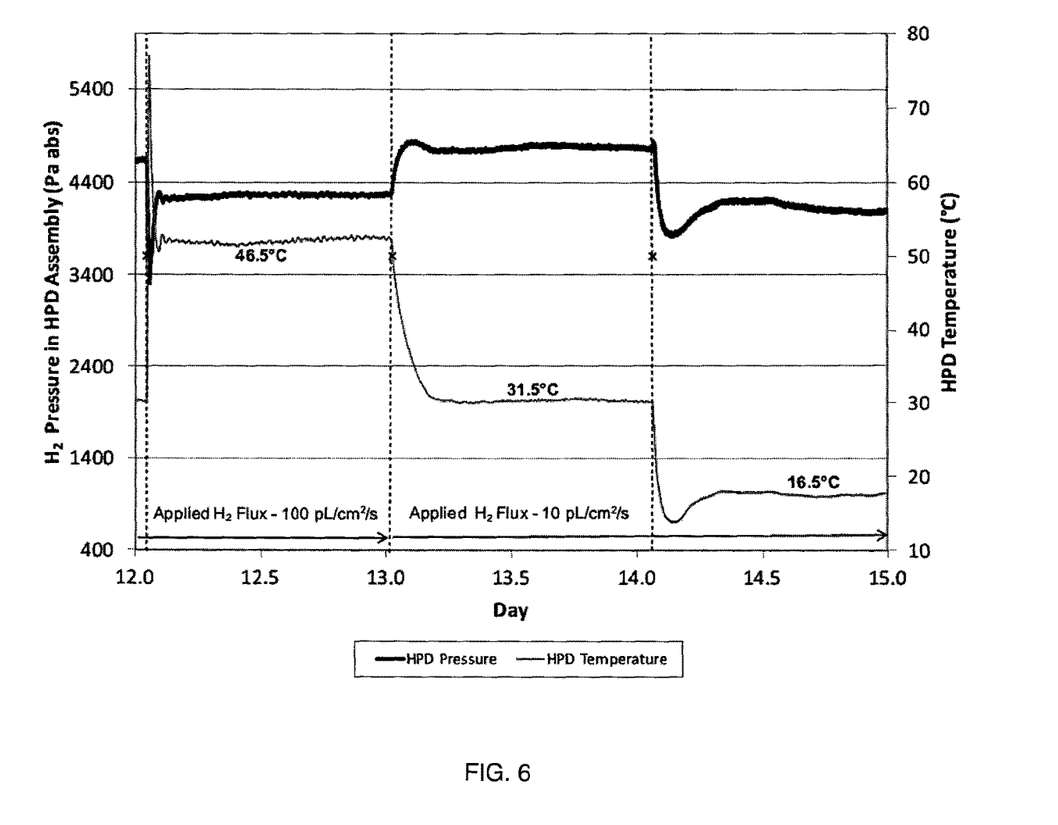
FIG. 6 are graphs of example system (complete system also referred to herein as HPPro) equilibrium tests.

Examples of hydrogen permeation calibration and the establishment of system equilibrium are shown in FIGS. 5 and 6, respectively. In the calibration test, the internal volume of the HPD is charged with a known and measurable pressure of hydrogen gas at a specified temperature. The decrease in pressure within the system is related to the HPD materials' hydrogen permeability and thus provides a direct calibration of this physical parameter. For the equilibrium pressure test, a controlled hydrogen pressure is maintained within the piping being monitored at the specified temperature. Changes in hydrogen pressure or temperature are recorded as a change in the plateau pressure observed within the HPPro sensor assembly and are a function of both the hydrogen inlet flux ($J_{H2}$) and the permeability of the HPD membrane materials ($\phi_{HPD}$) as a function of temperature.

While a number of exemplary aspects and examples have been discussed above, those of skill in the art will recognize certain modifications, permutations, additions and sub-combinations thereof.

REFERENCES

1. McKeen, K., Lalonde, M., Scott, A., Ross, J., "Hydrogen Effusion Probe Development and Installation at the Point Lepreau Generating Station", 28th Annual Conference of the Canadian Nuclear Society—Embracing the Future: Canada's Nuclear Renewal and Growth, v 2, 2007, pp. 1045-1056.
2. Stuart, C. R., Cook, W. and Gardner, E., "Primary Heat Transport System Return To Service Following The Refurbishment Outage At The Point Lepreau Generating Station", Proceedings, Nuclear Plant Chemistry Conference—NPC2014, Sapporo, Japan, October 2014.
3. Morreale, B. D. et al, "The permeability of hydrogen in bulk palladium at elevated temperatures and pressures", Journal of Membrane Science, vol. 212, pp. 87-97, 2003.

What is claimed is:

1. A system for monitoring hydrogen flux across the wall of a vessel or pipe, the system comprising:
    a closed container defining a monitored volume and including a first inlet into the closed container for sealing attachment to an outside surface of the wall of the vessel or pipe for collecting, via the inlet, hydrogen escaping across the wall surface;
    the first closed container further including a first and second outlets from the closed container, a membrane selectively permeable to hydrogen at the first outlet for permitting hydrogen to escape from the monitored volume at a defined rate such that hydrogen pressure equilibrium may be reached in the monitored volume for a given hydrogen flux across the wall of the vessel or pipe;
    a pressure measuring device connected to the second outlet and in fluid communication with the monitored volume for measuring hydrogen pressure in the monitored volume; and
    a temperature measuring device in communication with the monitored volume for measuring temperature in the monitored volume.

2. The system of claim 1, wherein the pressure measuring device is a pressure transducer and the temperature measuring device is a thermocouple or resistance temperature detector.

3. The system of claim 1, wherein the first closed container is a cup with a sealing gasket for sealing the cup to the wall of the vessel or pipe.

4. The system of claim 3, further including a valve connected to the cup to which a vacuum pump is attachable for evacuating the monitored volume.

5. A method for monitoring hydrogen flux across the wall of a vessel or pipe, the method comprising:
    providing a closed volume sealingly attached to the outside surface of the wall of the vessel or pipe for receiving hydrogen escaping from the vessel or pipe;
    providing a membrane selectively permeable to hydrogen in fluid communication with the closed volume for permitting hydrogen to escape from the closed volume at a defined rate such that hydrogen pressure equilibrium may be reached in the closed volume for a given hydrogen flux across the wall of the vessel or pipe;
    allowing hydrogen pressure in the closed volume to reach an equilibrium state where the hydrogen flux across the wall into the closed volume is in equilibrium with the hydrogen flux across the membrane out of the closed volume;
    measuring the pressure and temperature in the closed volume; and
    calculating the rate of hydrogen flux across the wall using the measured pressure and temperature values.

6. The method of claim 5, wherein the pressure and temperature measurements are carried out with the pressure in the closed volume in an equilibrium state.

7. The method of claim 5, wherein the pressure and temperature measurements are carried out with the pressure in the closed volume in a transient state.

8. The method of claim 5, wherein the hydrogen flux into the closed volume is related to a hydrogen concentration in the vessel or the pipe.

9. The method of claim 5, wherein the hydrogen flux is related to a corrosion rate of the wall of the vessel or pipe.

10. A system for monitoring hydrogen flux across the wall of a vessel or pipe, the system comprising:
- a first closed container including
  - an inlet for sealing attachment to an outside surface of the wall of the vessel or pipe for collecting, via the inlet, hydrogen escaping across the wall surface; defining a monitored volume, and
  - an outlet from the first closed container,
- a second closed container including
  - an inlet and first and second outlets,
- a tube connecting the outlet of the first closed container to the inlet of the second closed container, the first and second closed containers and the tube defining a monitored volume,
- a membrane selectively permeable to hydrogen located at the first outlet to the second closed container for permitting hydrogen to escape through the membrane from the monitored volume at a defined rate such that hydrogen pressure equilibrium may be reached in the monitored volume for a given hydrogen flux across the wall of the vessel or pipe;
- a pressure measuring device connected to the second outlet and in fluid communication with the monitored volume for measuring hydrogen pressure in the monitored volume; and
- a temperature measuring device in communication with the monitored volume for measuring temperature in the monitored volume.

11. The system of claim 10, wherein the first closed container is a cup with a sealing gasket for sealing the cup to the wall of the vessel or pipe.

12. The system of claim 10, wherein the second closed container is a vacuum fitting.

13. The system of claim 12, wherein the vacuum fitting is a tubular cross having four branches, and wherein
- the first outlet to the second closed container is a first branch of the cross,
- the inlet of the second closed container is a second branch of the cross, and
- the second inlet of the second closed container is a third branch of the cross.

\* \* \* \* \*